(12) United States Patent
Willis et al.

(10) Patent No.: US 9,563,984 B2
(45) Date of Patent: Feb. 7, 2017

(54) INTEGRATING COMPONENTS INTO 3D PRINTED OBJECTS

(71) Applicant: Autodesk, Inc., San Rafael, CA (US)

(72) Inventors: Karl Willis, Millbrae, CA (US); Mark Thomas Davis, Mill Valley, CA (US); Erin Marie Bradner, Berkeley, CA (US); Benjamin David Cochran, Corte Madera, CA (US); Francesco Iorio, Toronto (CA); David Thornton, Commerce Township, MI (US)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 14/671,938

(22) Filed: Mar. 27, 2015

(65) Prior Publication Data

US 2015/0287247 A1    Oct. 8, 2015

Related U.S. Application Data

(60) Provisional application No. 61/974,036, filed on Apr. 2, 2014.

(51) Int. Cl.

| | |
|---|---|
| *G06T 19/20* | (2011.01) |
| *G06K 19/06* | (2006.01) |
| *G06T 11/60* | (2006.01) |
| *G06K 19/067* | (2006.01) |
| *G06K 19/077* | (2006.01) |

(52) U.S. Cl.
CPC ......... *G06T 19/20* (2013.01); *G06K 19/06009* (2013.01); *G06K 19/0672* (2013.01); *G06K 19/07758* (2013.01); *G06T 11/60* (2013.01); *G06T 2219/2004* (2013.01)

(58) Field of Classification Search
None
See application file for complete search history.

(56) References Cited

U.S. PATENT DOCUMENTS

| | | | |
|---|---|---|---|
| 9,117,327 B1* | 8/2015 | Wasil ..................... | G07F 19/203 |
| 2008/0209226 A1* | 8/2008 | Venkatesan ........... | H04L 9/3231 |
| | | | 713/186 |
| 2014/0210856 A1* | 7/2014 | Finn ..................... | G01C 15/002 |
| | | | 345/633 |
| 2015/0227642 A1* | 8/2015 | Chang .................... | G06F 17/50 |
| | | | 703/1 |
| 2015/0239270 A1* | 8/2015 | Attia .................... | B29C 67/0051 |
| | | | 347/110 |
| 2015/0250420 A1* | 9/2015 | Longinotti-Buitoni | A61B 5/6804 |
| | | | 600/301 |

* cited by examiner

*Primary Examiner* — James A Thompson
*Assistant Examiner* — Tapas Mazumder
(74) *Attorney, Agent, or Firm* — Fish & Richardson P.C.

(57) ABSTRACT

Methods, systems, and apparatus, including computer programs encoded on a storage medium, for integrating components into objects that are to be 3D printed. One of the methods includes obtaining a three-dimensional model of a first object; receiving an input identifying an additional component; generating a digital representation of the additional component; integrating the digital representation of the additional component with the three-dimensional model; and providing the three-dimensional model with the integrated digital representation to a 3D printer for fabrication.

11 Claims, 4 Drawing Sheets

INTEGRATING COMPONENTS INTO 3D PRINTED OBJECTS

CROSS-REFERENCE TO RELATED APPLICATION

This application claims priority to U.S. Provisional Application No. 61/974,036, filed on Apr. 2, 2014. The disclosure of the prior application is considered part of and is incorporated by reference in the disclosure of this application.

BACKGROUND

This disclosure relates generally to using computer-aided design (CAD) tools and techniques for three-dimensional (3D) printing.

3D printers can be configured to fabricate physical objects from three-dimensional models of the objects. In particular, a CAD tool can be configured to generate or load a three-dimensional CAD model of the object and to provide the model to a 3D printer for use in fabricating a physical object from the model.

SUMMARY

In general, one innovative aspect of the subject matter described in this specification can be embodied in methods that include the actions of obtaining a three-dimensional model of a first object; receiving an input identifying an additional component; generating a digital representation of the additional component; integrating the digital representation of the additional component with the three-dimensional model; and providing the three-dimensional model with the integrated digital representation to a 3D printer for fabrication. Other embodiments of this aspect include corresponding systems, apparatus, and computer programs, configured to perform the actions of the methods, encoded on computer storage devices.

These and other embodiments can each optionally include one or more of the following features. Some aspects further include displaying data identifying a suggested additional component; and wherein the input identifying the additional component is an input selecting the suggested additional component. In some aspects, the additional component is a machine-readable tag that uniquely identifies the first object. In some aspects, the machine-readable tag includes a spatial pattern of conductive circles that uniquely identifies the first object. In some aspects, the machine-readable tag includes spatial tag patterns that reflect electro-magnetic radiation with a signal that uniquely identifies the first object. In some aspects, the additional component is an active sensor. In some aspects, the additional component is a passive sensor. In some aspects, the additional component is a tag that broadcasts a location of the first object. In some aspects, the additional component is a biological biometric tag that uniquely identifies an intended owner of the first object. Some aspects further include obtaining data necessary to generate the digital representation of the additional component. In some aspects, integrating the digital representation of the additional component includes: selecting a location for integrating the digital representation within or on the model.

Particular embodiments of the subject matter described in this specification can be implemented to realize one or more of the following advantages. Prior to 3D printing an object based on a model represented in a CAD system, a user can easily add static or dynamic data that can be embedded in the object when it is fabricated. In order to allow a user to add static or dynamic information to an object that is to be 3D printed, the CAD system can receive the information and generate a 3D representation of an appropriate component that embodies the requested information in the 3D printed object. For example, the data can be fabricated on the object in the form of a sensor that allows the user to track the condition of the fabricated object or of particular properties of the fabricated object or the environment associated with the fabricated object over time. Other examples of components that can be fabricated along with the object include a machine-readable tag or other tag that can uniquely identify the object, a biometric tag that can uniquely identify the owner of the object, and so on. Thus, a CAD system can allow a user to easily select data that is to be embedded in a 3D printed object before the object is 3D printed. Once the object is fabricated, the data can be stored, read, tracked, and retrieved over time, e.g., using a device configured to read the data or by direct observation.

The details of one or more embodiments of the invention are set forth in the accompanying drawings and the description below. Other features, aspects, and advantages of the invention will become apparent from the description, the drawings, and the claims.

DETAILED DESCRIPTION

This specification generally describes techniques for embedding data in a 3D printed object. For example, the data can be static data, e.g., an ID tag, or dynamic data, e.g., a sensor. The data can be fabricated into a 3D printed object in order to allow the data to be stored, read, tracked, and retrieved over time. Generally, a CAD system receives information provided by a user that identifies a type of data to be embedded in the object and generates a 3D geometry that allows the data to be embedded into a 3D printed object, e.g., a 3D representation of an additional component that embodies the type of data.

Figure 1:
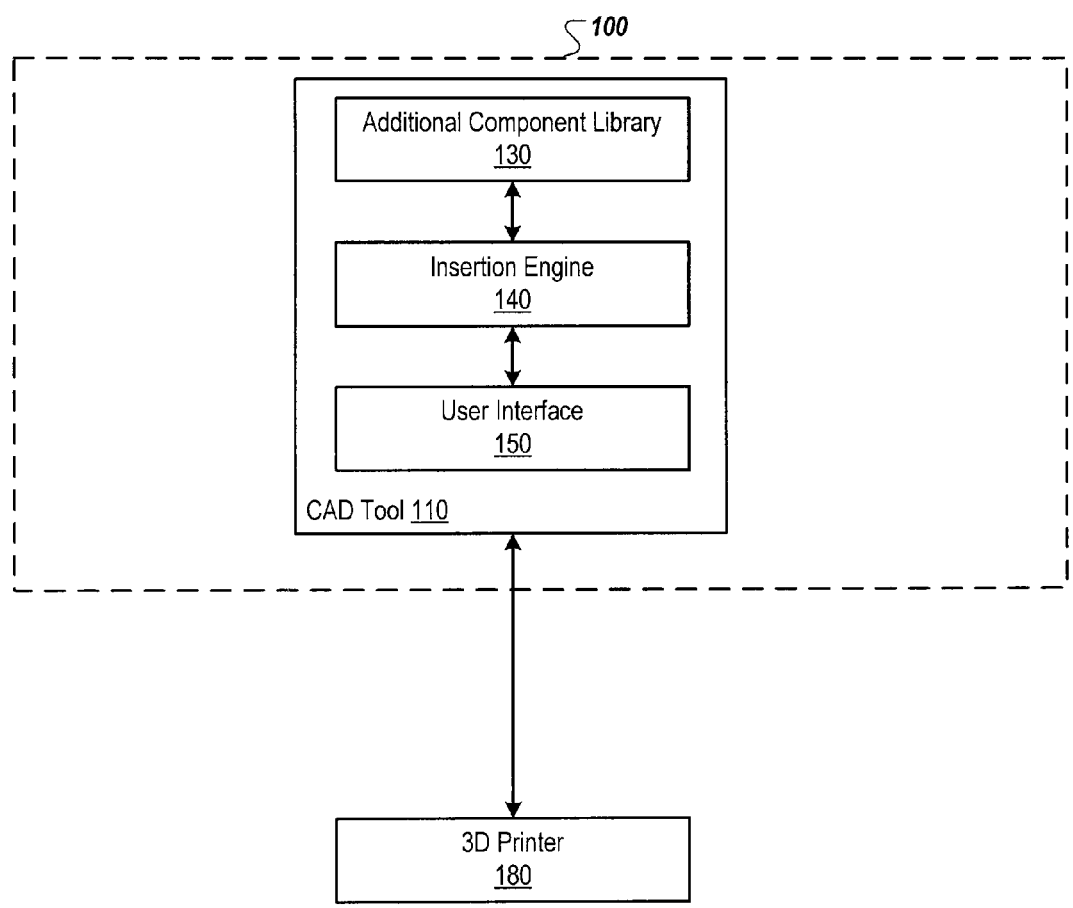
FIG. 1 is a diagram of an example CAD system.

FIG. 1 is a high-level illustration of an example CAD system 100 that can be used to develop a model of an object and ultimately produce a physical manifestation of the model, e.g., in conjunction with a 3D printer. Although this diagram depicts objects/processes as logically separate, such depiction is merely for illustrative purposes. The objects/processes portrayed in this figure can be arbitrarily combined or divided into separate software, firmware, or hardware components. Furthermore, such objects/processes, regardless of how they are combined or divided, can execute on the same data processing apparatus or can be distributed among different data processing apparatus connected by one or more networks (e.g., the Internet).

CAD system 100 includes a computer-aided design (CAD) tool 110. The CAD tool 110 allows a user to generate and/or load a three-dimensional digital model of an object, i.e., a three-dimensional CAD model of the object. The CAD tool 110 includes, without limitation, an additional component library 130, an insertion engine 140 and a user interface 150. The digital model of the object can be viewed and, optionally, modified by the user through the user interface 150. The CAD tool 110 is communicatively coupled to a 3D printer 180 and can provide instructions to the 3D printer 180 that cause the 3D printer to fabricate a physical object using the three-dimensional digital model. That is, the CAD tool 110 can provide the model to the 3D printer 180 and the 3D printer 180 can use the model to fabricate the modeled object.

Prior to the object being fabricated by the 3D printer 180, the insertion engine 140 can insert a digital representation of an additional component from the additional component library 130 into the digital model. The additional component library 130 stores data identifying additional components and characteristics of the additional components, e.g., insertion criteria for the additional components and data for generating the digital representation of the additional components. Once the digital representation of the additional component has been integrated into the digital model, the CAD tool 110 can cause the 3D printer to fabricate the object with the additional component.

The CAD tool 110 can receive a user input identifying data to be embedded in the fabricated object and can select an appropriate additional component from the additional component library 130 that embodies the data. For example, the additional component can be a sensor, a machine-readable tag that uniquely identifies the object, a biological biometric tag that uniquely identifies the intended owner of the fabricated object, and so on. Examples of additional components and inserting digital representations of additional components into a digital model of an object to be fabricated is described below with reference to FIGS. 2 and 3.

Figure 2:
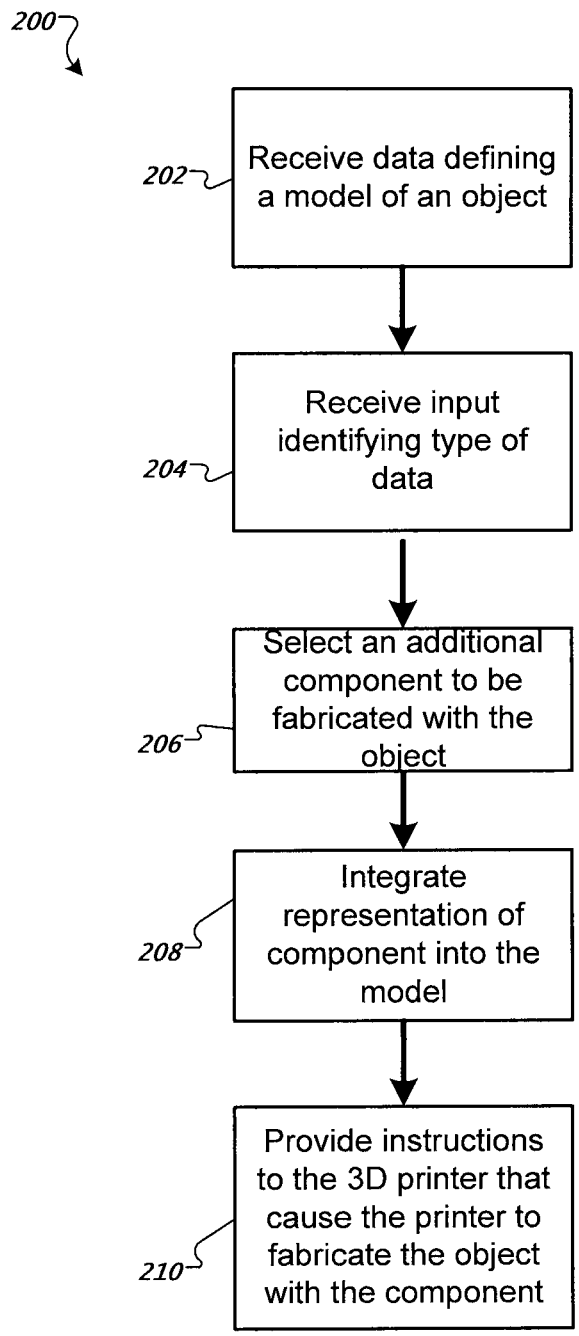
FIG. 2 is a flow diagram of an example technique for fabricating an object with an additional component.

FIG. 2 is a flow diagram of an example technique 200 for 3D printing an object with an additional component. For convenience, the technique 200 will be described with respect to a system, including one or more data processing apparatus, that performs the technique 200. For example, the technique 200 can be performed by a CAD system, e.g., CAD system 100 of FIG. 1.

At step 202, data defining a model of an object that is to be fabricated using a 3D printer is received. For example, the model can be a three-dimensional CAD model of the object.

At step 204, a user input identifying data to be embedded in the object when the object is fabricated is received. The data can be either static data, e.g., data that uniquely identifies the object, or dynamic data, e.g., data that changes over the life of the object. For example, the data may be received in response to a prompt that asks the user whether they would like a particular type of data inserted with the object, e.g., whether they would like to insert an identifier into the object, whether they would like to be able to measure the wear on the object over time, and so on. As another example, a list or other presentation of possible additional components that each embodies a different kind of data and that may be fabricated as part of the object can be presented to the user in a user interface. The user can then select one of the presented components as the additional component that is to be inserted into the object. The presented possible additional components can be selected from additional components identified in an additional component library accessible to the system.

At step 206, an additional component that embodies the identified data and that is to be fabricated as part of the modeled object is selected. For example, as described above, the user may select the additional component from a presentation of possible components. As another example, in response to receiving a user input identifying a particular type of data to be embedded in the fabricated object, an appropriate component for embodying that data is selected.

For example, the additional component may be a machine-readable tag that uniquely identifies the object that is to be fabricated, i.e., that distinguishes a current instance of the object from otherwise identical objects. The machine-readable tag may be composed of multiple materials, e.g., the tag may be composed of a combination of a conductive material and a dielectric material, and can include a spatial pattern that is unique to the object.

For example, the machine-readable tag may be generated by fabricating a spatial pattern of conductive circles on the bottom of the physical object, i.e., on one of the surfaces of the object that is to be fabricated. Each conductive circle may be connected to a pathway of conductive material that leads through the body of the object to the upper surface of the object. After the physical object is fabricated, the object can be uniquely identified by placing the conductive surface of the fabricated tag on a capacitive touch screen in order to cause the touchscreen to register a spatial pattern of touch points that can uniquely identify the object, i.e., that can match the spatial pattern of touch points to a pattern in a database of patterns that is associated with the object.

In some implementations, an asymmetrical spatial layout of the tag can be used. The number of circles and their spatial location can be used to reveal the orientation of the object in relation to the capacitive touch screen. As the user touches and rotates the object the spatial pattern of touch points can be recognized to localize the position and orientation of the object.

As another example, the machine-readable tag may include spatial tag patterns inside of the physical object that are made out of a conductive material and that reflect electro-magnetic radiation, e.g., radio waves, with a unique signal. After fabrication, a transmitter may be used to send a signal towards the object and to receive the signal that is reflected by the tag that was fabricated with the object. The received reflected signal can then be compared with a database of signals to identify the object that is associated with the signal. In particular, the signal transmitted toward the object may be a signal in an area of the electro-magnetic spectrum where the dielectric material used to fabricate the tag has high transmission.

As another example, the additional component can be a tag that can broadcast the location of the fabricated object. For example, the additional component can be a radio-frequency identification (RFID) tag that uses electromagnetic fields to wirelessly transfer data and allows the object to be tracked wirelessly. The RFID tag may be a passive RFID tag, e.g., a tag that reflects electromagnetic energy and does not require an internal battery, or an active RFID tag, e.g., a tag that transmits electromagnetic energy using an internal battery. The system may select whether to embed a passive or active RFID tag based on the object that the tag is to be embedded in, e.g., based on whether the 3D representation of the object already includes an internal battery. In addition to broadcasting the location of the fabricated object, the RFID tag can identify unique aspects of the object and transmit information about the unique aspects to a data repository.

As another example, the additional component can be a sensor configured to monitor a property or characteristic of the fabricated object or of a part of the fabricated object. That is, the sensor may be configured to monitor defects in a fabricated object, wear on a specific portion of the fabricated object, improper placement or fit of a part of the object, and so on. The sensor may be an active sensor, i.e., a sensor that includes one or more circuits that allow the sensor to transmit or receive signals, or a passive sensor, i.e., a sensor that does not include a circuit but that can be observed to provide insight as to a desired characteristic of the fabricated object. For example, an active sensor may be a sensor that records the temperature of a portion of the fabricated object, e.g., a portion that is in proximity to a heat-radiating manifold to determine whether the portion is constructed from a material that is sufficiently heat-resistant. In addition to recording the temperature, the sensor may be configured to, e.g., transmit the most-current recorded temperature at pre-determined intervals.

Passive sensors can include markers, e.g., wear markers, that when exposed, indicate that an outer surface of the object has experienced an excessive amount of wear or deterioration. For example, the passive sensor can be over-printed so that with physical or mechanical wear, force, or exposure to a specific environment, e.g., exposure to water or other chemical exposure, the visibility or properties of the passive sensor are altered. Additionally, when layers of the passive sensor deteriorate due to oxidation, a different version of the passive can be revealed, indicating that the object has entered a new state. As another example, passive sensors can include fiducial codes, e.g., dynamic Quick Response Codes (QR codes), that change or otherwise indicate wear as the part that the QR code is printed on wears down or changes over time, e.g., changes color over time. Other types of passive sensors, e.g., non-visual sensors, e.g., haptic or acoustic codes, are also possible.

As another example, the additional component can be a biological biometric tag that uniquely identifies an intended owner of the fabricated object. For example, the additional component may be a Deoxyribonucleic acid (DNA) biometric tag. For example, the system can receive as an input a unique DNA signature for the intended owner of the object. The system can then generate a tag that embodies the unique DNA signature to be embedded in the object. Optionally, the tag can be generated so that some deviation in the DNA signature is tolerated, e.g., so that DNA signatures within a threshold proximity of the received DNA signature can also be authenticated by the tag. This can allow, e.g., family members, including currently unborn descendants, of the user having the received unique DNA signature to also be considered as matching the DNA signature. In some implementations, the biological biometric tag may be used to authenticate the intended owner of the fabricated object, i.e., so only the owner is able to use the object or certain features of the fabricated object. For example, the system can generate the tag so that the object fails to activate unless a DNA match is obtained and confirmed using the tag. In addition to or instead of DNA, the tag can also embody other uniquely identifying information, e.g., retina information that uniquely identifies the intended owner.

As another example, the additional component may be a refractive index tag. The refractive index tag includes two transparent materials that have a large difference in refractive index but otherwise have identical quantities. To generate the refractive index tag, the materials are printed in a pre-determined spatial pattern with a constant depth. Because the two materials have a large difference in refractive index, they are discernible from one another when scanned with a time-of-flight (TOF) depth camera. In particular, light emitted from the TOF camera travels through the spatial tag, reflects off the surface of the opaque 3D printed object, and returns to the TOF camera sensor. Because the refractive indices of the two materials are different, the TOF camera will register a difference in depth between the two materials. Thus, because the materials are transparent, machine readable information can be embedded into the surface of 3D printed objects while remaining invisible to the human eye using refractive index tags, e.g., because the tags appear as transparent coatings on the surface of the object.

As another example, the additional component may be a texture tag. The texture tag can be embedded on the surface of the object and includes a slightly textured material. When the tag is illuminated with a bright, directional light source, e.g., a camera flash, the textures may cast a shadow and reveal machine readable information that can be captured and analyzed by a standard camera. For example, a 3D printer can be instructed to fabricate the texture tag by modifying the 3D printer toolpath generation to create structured deviations from the standard toolpath, e.g. off-setting and insetting the toolpath. The spacing and distribution of the toolpath deviations can be optimized so that the overall pattern is not discernible to the user, but can be recognized using computer vision techniques for reliable decoding.

Optionally, prior to receiving the user selection of the additional component, data identifying a suggested or recommended additional component may be provided to the user. That is, an appropriate additional component to be fabricated with the currently modeled object can be determined based on the type of object that is being modeled, the dimensions of the modeled object, and so on, and data identifying the appropriate additional component can be provided to the user. Certain types of objects may be associated with certain types of embedded data, e.g., objects that are designed to be exposed to high temperatures may be associated with dynamic data that measures wear on external surfaces of the object. If the object is of a type that is associated with a type of embedded data, an additional component that embodies that type of data may be recommended to the user. The user can then submit an input confirming that the appropriate additional component should be fabricated as part of the modeled object.

At step 208, a digital representation of the additional component is integrated into the model of the object. Generating a digital representation of the additional component and integrating the digital representation into the model of the object is described below with reference to FIG. 3.

At step 210, instructions are provided to the 3D printer that cause the 3D printer to fabricate the object with the additional component. That is, the model of the object that includes the integrated digital representation of the additional component is provided to the 3D printer and the 3D printer uses the model to fabricate the additional component as part of the modeled object.

Figure 3:
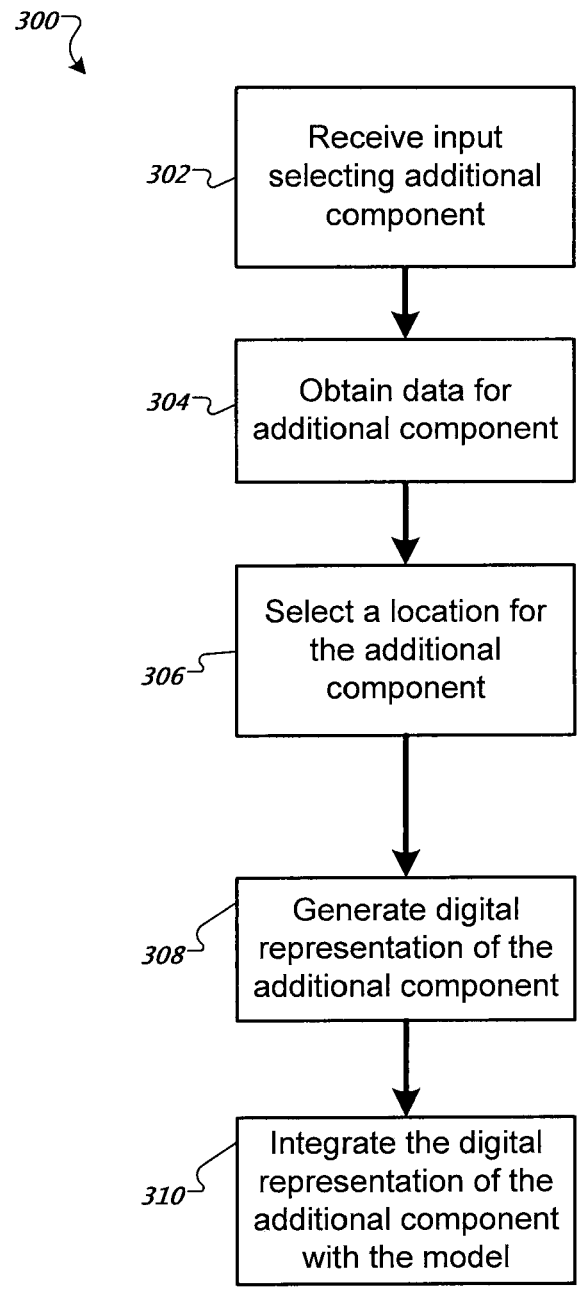
FIG. 3 is a flow diagram of an example technique for generating a representation of an additional component.

FIG. 3 is a flow diagram of an example technique 300 for generating a digital representation of an additional component. For convenience, the technique 300 will be described with respect to a system, including one or more data processing apparatus, that performs the technique 300. For example, the technique 300 can be performed by a CAD system, e.g., CAD system 100 of FIG. 1.

At step 302, an input is received selecting an additional component that is to be fabricated with an object using a 3D printer. For example, the input may be a user input selecting an additional component from a list or other presentation of additional components that are appropriate or otherwise available for integration with the object.

At step 304, data for the additional component is obtained. The obtained data is generally specific to the type of additional component and is necessary for fabricating the additional component.

For example, if the additional component is a biological biometric tag that uniquely identifies an intended owner of the object, the obtained data can include biometric information for the intended owner that is to be embedded in the biometric tag.

As another example, if the additional component is a tag that uniquely identifies the fabricated object, the obtained data can include the uniquely identifying information for the object. For example, if the additional component is a machine-readable tag that includes a pattern that is unique to the object, obtaining the data can include creating the unique pattern and storing the unique pattern in a data structure for future identification of the object. Alternatively, the obtaining can include obtaining data identifying the unique pattern from an external source.

In some implementations, the system can automatically generate the uniquely identifying information in response to the received input and then store the information in a database for later use. In some implementations, the identifying information is provided by the user through a user interface.

At step 306, a location in the object for inserting the additional component is selected. In some implementations, the location is selected from a user input, e.g., a user input submitted through a user interface identifying a location in the displayed model of the object for insertion of the additional component. In some implementations, a suggested location for the additional component is provided to the user and the user may submit an input approving the suggested location. The suggested location can be a location that satisfies criteria associated with the additional component. For example, depending on the type of additional component, the criteria may specify that the component be located on an external surface of the object, within a threshold distance of a particular portion of the object, or both. As another example, the criteria may specify that the additional component be oriented in a particular fashion. As another example, for components that must be read using an external sensor, the criteria may be based on the sensing capabilities of sensors available to read data from the component. That is, the criteria may specify that the component be located within a threshold distance of a surface of the object in order to allow available sensors to read data from the component.

At step 308, a digital representation of the additional component is generated using the data obtained for the additional component. The digital representation can be a three-dimensional CAD representation of the additional component and can be generated using conventional CAD techniques. Optionally, data that indicates the fabrication materials used to construct the additional component when it is fabricated can be included with the model, e.g., by marking different areas of the digital representation.

At step 310, the digital representation of the additional component is integrated with the model of the object at the selected location. Integrating can include creating a single model that includes the original model and the one or more additional components. Integrating can include verifying functional operation of the original object at or coincident with the time of integration so as to ensure viability of the integrated component once produced.

Figure 4:
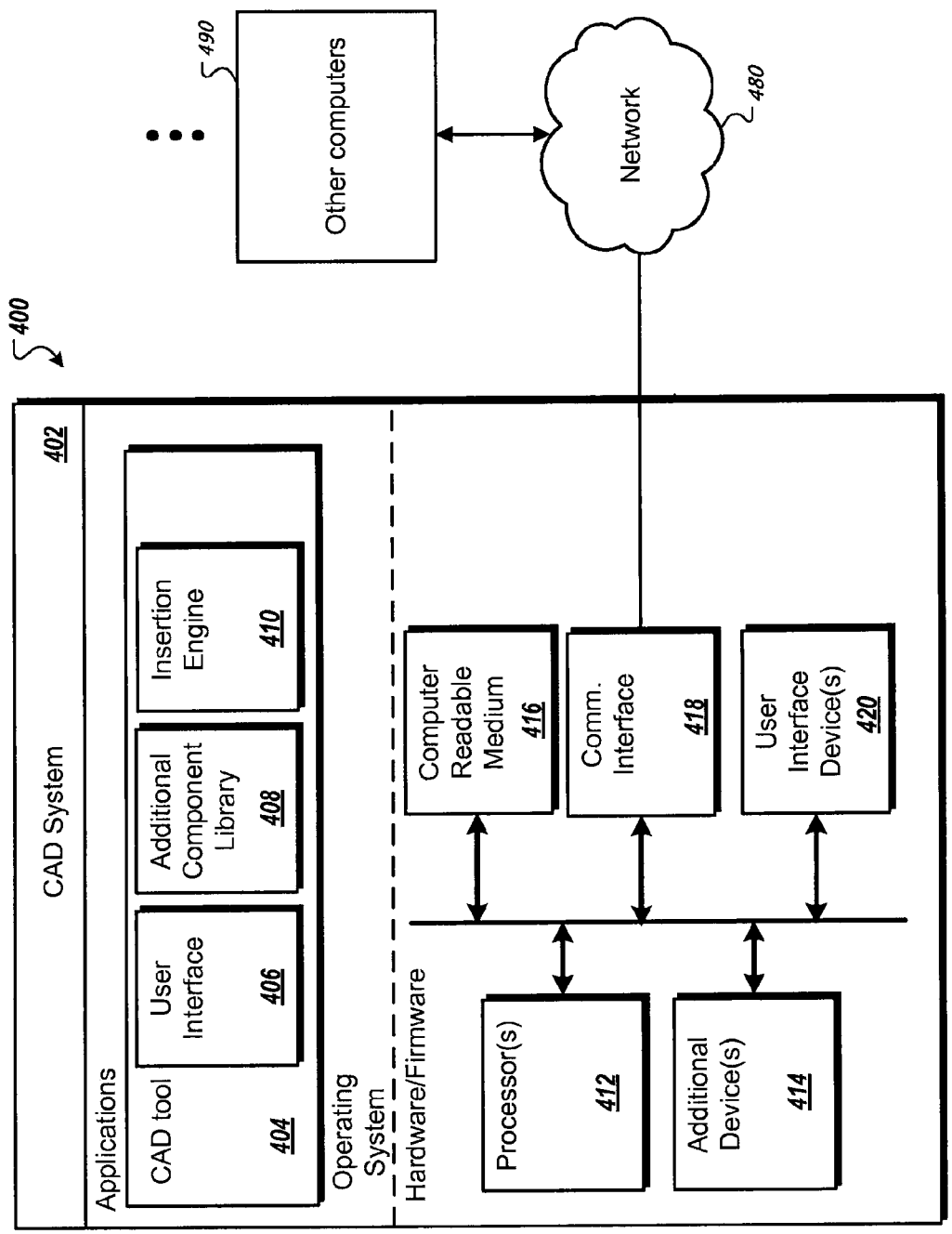
FIG. 4 is a schematic diagram of an example system for 3D printing an object with an additional component.
Like reference numbers and designations in the various drawings indicate like elements.

FIG. 4 is a schematic diagram of an example system for 3D printing an object with an additional component. The system generally consists of a CAD system 402. The CAD system 402 is optionally connected to one or more other computers 490 through a network 480. The CAD system 402 consists of one or more data processing apparatus. While only one data processing apparatus is shown in FIG. 4, multiple data processing apparatus can be used. The server 402 includes various modules, e.g. executable software programs, including a CAD tool 404 to allow a user to generate and/or load a CAD model of an object to be fabricated using a 3D printer. CAD tool 404 includes a user interface 406, an additional component library 408, and an insertion engine 410.

Each module runs as part of the operating system on the CAD system 402, runs as an application on the CAD system 402, or runs as part of the operating system and part of an application on the CAD system 402, for instance. Although several software modules are illustrated, there may be fewer or more software modules. Moreover, the software modules can be distributed on one or more data processing apparatus connected by one or more networks or other suitable communication mediums.

The CAD system 402 can also include hardware or firmware devices including one or more processors 412, one or more additional devices 414, a computer readable medium 416, a communication interface 420, and one or more user interface devices 422. Each processor 412 is capable of processing instructions for execution within the server 402. In some implementations, the processor 412 is a single or multi-threaded processor. Each processor 412 is capable of processing instructions stored on the computer readable medium 416 or on a storage device such as one of the additional devices 414. The CAD system 402 uses its communication interface 420 to communicate with one or more computers 490, for example, over a network 480. Examples of user interface devices 422 include a display, a camera, a speaker, a microphone, a tactile feedback device, a keyboard, and a mouse. The CAD system 402 can store instructions that implement operations associated with the modules described above, for example, on the computer readable medium 416 or one or more additional devices 414, for example, one or more of a floppy disk device, a hard disk device, an optical disk device, flash, other forms of memory or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., a CAD model, analytical energy model, simulation results, analysis report) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    obtaining a three-dimensional model of a first object to be fabricated by a 3D printer;
    receiving an input identifying an additional component to be embedded in the first object when the first object is fabricated, wherein the additional component uniquely identifies the first object;
    obtaining a spatial pattern of conductive circles that uniquely identifies the first object, wherein each conductive circle is connected to a pathway of conductive material that leads through a body of the first object to an outer surface of the first object;
    generating a digital representation of a machine-readable tag that includes the spatial pattern of conductive circles;
    integrating the digital representation of the machine-readable tag with the three-dimensional model;
    providing the three-dimensional model with the integrated digital representation to the 3D printer for fabrication; and
    storing data associating the first object with the spatial pattern of conductive circles that uniquely identifies the first object.

2. The method of claim 1, further comprising:
    displaying data identifying a suggested additional component; and
    wherein the input identifying the additional component is an input selecting the suggested additional component.

3. The method of claim 1, further comprising:
    obtaining data necessary to generate the digital representation of the additional component.

4. The method of claim 1, wherein integrating the digital representation of the additional component comprises:
    selecting a location for integrating the digital representation within or on the model.

5. The method of claim 1, wherein integrating the digital representation of the machine-readable tag with the three-dimensional model comprises placing the spatial pattern of conductive circles on a surface of the first object that is to be fabricated.

6. A system comprising:
    one or more processors and one or more storage devices storing instructions that when executed by the one or more processors cause the one or more processors to perform operations comprising:
        obtaining a three-dimensional model of a first object to be fabricated by a 3D printer;
        receiving an input identifying an additional component to be embedded in the first object when the first object is fabricated, wherein the additional component uniquely identifies the first object;
        obtaining a spatial pattern of conductive circles that uniquely identifies the first object, wherein each conductive circle is connected to a pathway of conductive material that leads through a body of the first object to an outer surface of the first object;
        generating a digital representation of a machine-readable tag that includes the spatial pattern of conductive circles;
        integrating the digital representation of the machine-readable tag with the three-dimensional model;
        providing the three-dimensional model with the integrated digital representation to the 3D printer for fabrication; and
        storing data associating the first object with the spatial pattern of conductive circles that uniquely identifies the first object.

7. The system of claim 6, the operations further comprising:
    displaying data identifying a suggested additional component; and
    wherein the input identifying the additional component is an input selecting the suggested additional component.

8. The system of claim 6, wherein integrating the digital representation of the additional component comprises:
    selecting a location for integrating the digital representation within or on the model.

9. The system of claim 6, wherein integrating the digital representation of the machine-readable tag with the three-dimensional model comprises placing the spatial pattern of conductive circles on a surface of the first object that is to be fabricated.

10. A computer storage medium encoded with a computer program, the computer program comprising instructions that when executed by one or more data processing apparatus cause the data processing apparatus to perform operations comprising:
    obtaining a three-dimensional model of a first object;
        obtaining a three-dimensional model of a first object to be fabricated by a 3D printer;
        receiving an input identifying an additional component to be embedded in the first object when the first object is fabricated, wherein the additional component uniquely identifies the first object;
        obtaining a spatial pattern of conductive circles that uniquely identifies the first object, wherein each conductive circle is connected to a pathway of conductive material that leads through a body of the first object to an outer surface of the first object;
        generating a digital representation of a machine-readable tag that includes the spatial pattern of conductive circles;

integrating the digital representation of the machine-readable tag with the three-dimensional model;
providing the three-dimensional model with the integrated digital representation to the 3D printer for fabrication; and
storing data associating the first object with the spatial pattern of conductive circles that uniquely identifies the first object.

11. The computer storage medium of claim 10, wherein integrating the digital representation of the machine-readable tag with the three-dimensional model comprises placing the spatial pattern of conductive circles on a surface of the first object that is to be fabricated.

\* \* \* \* \*